G. W. TUCKER.
Gate.

No. 77,682. Patented May 5, 1868.

Witnesses. Inventor.

United States Patent Office.

G. W. TUCKER, OF ELBA TOWNSHIP, ILLINOIS.

Letters Patent No. 77,682, dated May 5, 1868.

IMPROVEMENT IN GATES.

*The Schedule referred to in these Letters Patent and making part of the same.*

TO ALL WHOM IT MAY CONCERN:

Be it known that I, G. W. TUCKER, of Elba township, in the county of Knox, and in the State of Illinois, have invented an Improved Gate; and do hereby declare that the following is a full, clear, and exact description thereof, reference being had to the accompanying drawings, making a part of this specification, in which—

Figure 1:
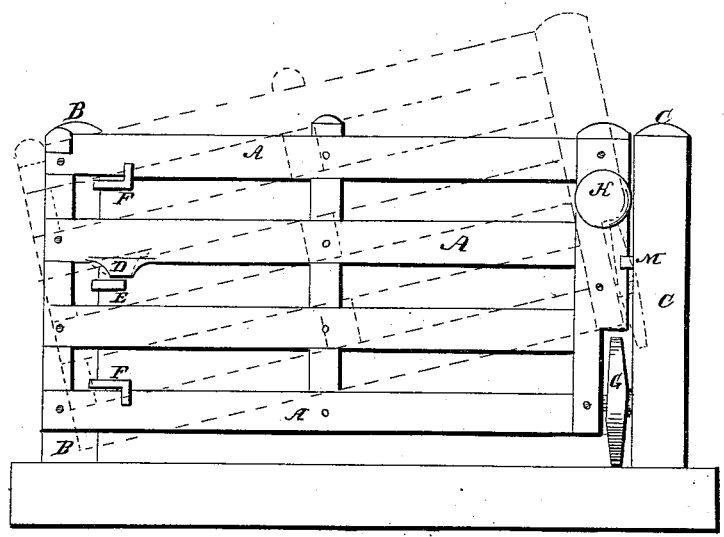
Figure 1 is a front elevation.
Figure 2:
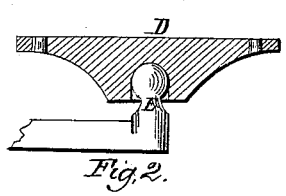
Figure 2 is a vertical section of the ball-and-socket bearing, upon which the back end of the gate turns.
Figure 3:
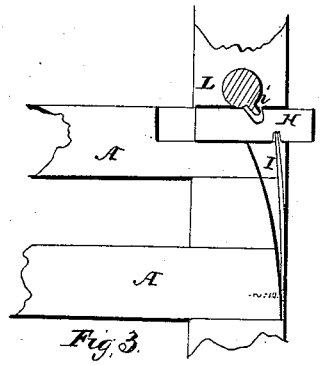
Figure 3 shows the arrangement for fastening the gate.

This invention is designed to furnish means for operating gates upon a side-hill, or where the ground is uneven, and also to relieve the gate and post from the strain caused by suspending the latter entirely by the hinges.

In the annexed drawings—

A represents the gate, and B and C the posts.

D represents a socket, attached to the gate near the back end, and above the centre, resting upon a corresponding ball, E, which is formed upon an ⌐-shaped hook, driven or screwed diagonally into the post B, the whole forming a ball-and-socket joint, upon which the gate turns.

F F represent ⌐-shaped hooks, driven diagonally into the post B, over the lower and under the upper rail, to keep the gate in place, and prevent hogs or other animals from lifting it.

G is a roller, with its axis parallel to the line of the gate, to which it is fastened by a pin, upon which it turns, used for supporting the front end of the gate.

H represents a bolt, sliding in a recess between the pieces forming the upright of the front end of the gate.

I represents a spring, the lower end of which is fastened to the upright by a screw or other means, while the upper end enters into a slot in the under side of the bolt H, holding it in place, with the end projecting from the upright, so as to engage a slot in the post C for the purpose of locking the gate.

The bolt H is drawn backward by turning the knob K, attached to the pin L, upon the lower side of which is a spur, $l$, working in a corresponding recess in the bolt. The whole of this fastening may be constructed of wood.

M represents a pin, projecting inwards from the post C, against which the gate shuts.

The operation of this gate is very simple. The whole weight rests upon the ball-and-socket joint and roller, which permit the front end of the gate to be raised sufficiently high to enable it to pass over any uneven ground with ease.

Its advantages over all others consist in its simplicity, cheapness, and durability. It can be easily made by any farmer, at a small cost, and the several parts are durable, and not liable to get out of order.

Having thus fully set forth the nature and merits of my invention, what I claim as new, and desire to secure by Letters Patent, is—

The ball E, socket D, hooks F, and roller G, in combination with the gate A, for the purpose substantially as herein set forth.

In testimony that I claim the foregoing, I have hereunto set my hand, this 19th day of March, 1868.

G. W. TUCKER.

Witnesses:
JOHN H. LISTER,
MATTHEW CRAIG.